US012583227B2

(12) United States Patent
Oki et al.

(10) Patent No.: US 12,583,227 B2
(45) Date of Patent: Mar. 24, 2026

(54) LIQUID CARTRIDGE HAVING STRUCTURE FOR SUPPRESSING LEAKAGE OF LIQUID DEPOSITED ON SEAL AND CAP

(71) Applicant: BROTHER KOGYO KABUSHIKI KAISHA, Nagoya (JP)

(72) Inventors: Satoru Oki, Nagoya (JP); Masahiro Hayashi, Anjo (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 58 days.

(21) Appl. No.: 18/392,453

(22) Filed: Dec. 21, 2023

(65) Prior Publication Data

US 2024/0316939 A1 Sep. 26, 2024

(30) Foreign Application Priority Data

Mar. 22, 2023 (JP) ................................. 2023-044905

(51) Int. Cl.
*B41J 2/175* (2006.01)

(52) U.S. Cl.
CPC ......... *B41J 2/17513* (2013.01); *B41J 2/1754* (2013.01); *B41J 2/17596* (2013.01)

(58) Field of Classification Search
CPC .. B41J 2/17513; B41J 2/1754; B41J 2/17596; B41J 2/17509; B41J 2/1752; B41J 2/17523; B41J 2/17553
USPC ........................................................... 347/86
See application file for complete search history.

(56) References Cited

U.S. PATENT DOCUMENTS

2013/0175272 A1* 7/2013 Shirono ............... B41J 2/17506 141/2
2020/0031132 A1 1/2020 Ono et al.
2021/0245519 A1 8/2021 Oki

FOREIGN PATENT DOCUMENTS

JP 2021-123034 A 8/2021
JP 2022-109318 A 7/2022

* cited by examiner

*Primary Examiner* — Jason S Uhlenhake
*Assistant Examiner* — Alexander D Shenderov
(74) *Attorney, Agent, or Firm* — Merchant & Gould P.C.

(57) ABSTRACT

A liquid cartridge includes a main body, a liquid channel, a seal, a valve, and a cap. The liquid channel extends in an extending direction and has an inner peripheral surface defining an internal space communicating with a storage chamber. The seal contacts the inner peripheral surface of the liquid channel for liquid tight seal therewith. The seal has a first through-hole penetrating therethrough in the extending direction. The valve is positioned closer to the storage chamber than the seal is. The cap is positioned closer to an outlet of the liquid channel than the seal is. The cap has a second through-hole penetrating therethrough in the extending direction and defining an axis extending in the extending direction. A space is defined by the inner peripheral surface of the liquid channel, the seal, and the cap. The cap has a cap opening positioned below the axis of the second through-hole.

14 Claims, 9 Drawing Sheets

COMPARATIVE EXAMPLE

LIQUID CARTRIDGE HAVING STRUCTURE FOR SUPPRESSING LEAKAGE OF LIQUID DEPOSITED ON SEAL AND CAP

REFERENCE TO RELATED APPLICATIONS

This application claims priority from Japanese Patent Application No. 2023-044905 filed on Mar. 22, 2023. The entire content of the priority application is incorporated herein by reference.

BACKGROUND ART

There has been known an ink cartridge that is attachable to and detachable from a cartridge receiving portion. In an inkjet recording device, for example, a hollow needle provided in the cartridge receiving portion is inserted in an ink supply opening of the ink cartridge. Accordingly, ink in the ink cartridge is supplied to an ink consumption portion through the ink supply opening and the needle. Further, a sealing member made from rubber or the like is disposed around the ink supply opening for sealing a minute gap between the ink supply opening and the needle.

SUMMARY

Due to the attachment and detachment of the ink cartridge to and from the cartridge receiving portion, ink may be accumulated on the sealing member positioned outside of a valve. The accumulated ink may drop from the ink cartridge due to gravity.

In view of the foregoing, it is an object of the present disclosure to provide a liquid cartridge that can restrain outflow of liquid accumulated on the outside of the valve.

In order to attain the above and other object, the present disclosure provides a liquid cartridge configured to be detachably attached to a cartridge receiving portion in an attached state. The liquid cartridge includes a main body, a liquid channel, a seal, a valve, and a cap. The main body defines therein a storage chamber for storing liquid. The liquid channel extends in an extending direction to have an outlet that is open to an outside of the liquid cartridge. The liquid channel has an inner peripheral surface defining an internal space in communication with the storage chamber. The seal is positioned in the internal space of the liquid channel and is in contact with the inner peripheral surface to provide a liquid-tight seal therebetween. The seal has a first through-hole penetrating through the seal in the extending direction. The valve is configured to open and close the first through-hole. The valve is positioned in the internal space of the liquid channel and is closer to the storage chamber than the seal is to the storage chamber in the extending direction. The cap is positioned closer to the outlet of the liquid channel than the seal is to the outlet of the liquid channel. The cap has a second through-hole penetrating through the cap in the extending direction and in communication with the first through-hole. The second through-hole defines an axis extending in the extending direction. The inner peripheral surface of the liquid channel, the seal, and the cap define a liquid retaining space at a position between the seal and the cap. The cap has a cap opening in communication with the liquid retaining space and the outside of the liquid cartridge. The cap opening is positioned below the axis of the second through-hole in the attached state of the liquid cartridge.

Due to attachment and detachment of the liquid cartridge to and from the cartridge receiving portion, liquid may be deposited on the first through-hole of the sealing member and the second through-hole of the cap at a position outside of a valve which closes the first through-hole. In a case where the liquid deposited on the first through-hole and the second through-hole is to flow out toward the outside, the liquid flows into the liquid retaining space through the opening of the cap. This configuration can restrain outflow of the liquid deposited on the first through-hole and the second through-hole to the outside of the liquid cartridge.

DESCRIPTION

Figure 1:
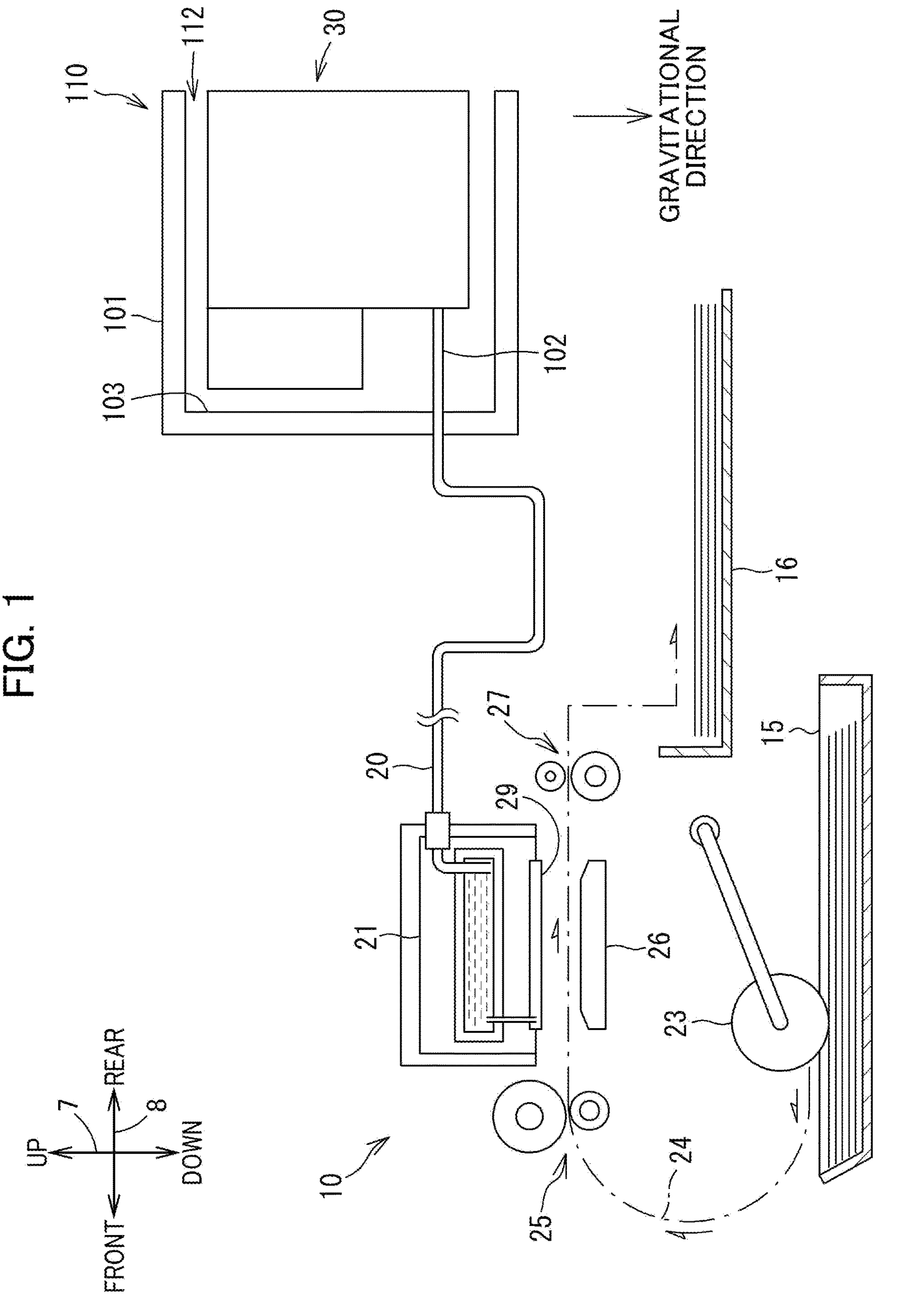
FIG. 1 is a vertical cross-sectional view schematically illustrating an internal structure of a printer 10.

Hereinafter, an ink cartridge 30 according to one embodiment of the present disclosure will be described with reference to the accompanying drawings.

In the following description, the ink cartridge 30 is assumed to be inserted into and removed from a cartridge receiving portion 110 of a printer 10 in a horizontal direction (a direction perpendicular to the gravitational direction). Hence, a front-rear direction 8 and a left-right direction 9 with respect to the ink cartridge 30 will be referred to as being horizontal. Still however, the front-rear direction 8 need not be horizontal. Further, an up-down direction 7 will be defined as the gravitational direction perpendicular to the front-rear direction 8. Thus, the left-right direction 9 will be defined as a direction perpendicular to the up-down direction 7 and the front-rear direction 8.

Further, in the following description, a state where the ink cartridge 30 is accommodated in the cartridge receiving portion 110 and is actually used thereby implies a state where the ink cartridge 30 has been inserted in the cartridge receiving portion 110 to be at an attached position therein. In the attached position of the ink cartridge 30, an ink needle 102 provided in the cartridge receiving portion 110 is inserted in a sleeve 33 of the ink cartridge 30 such that the ink needle 102 and the sleeve 33 are connected to each other. Hereinafter, a posture of the ink cartridge 30 accommodated in the cartridge receiving portion 110 to be used thereby will be referred to as “attached posture” of the ink cartridge 30, wherever necessary.

In the following description, a frontward direction represents the direction of insertion of the ink cartridge 30 into the cartridge receiving portion 110, and a rearward direction represents the direction of removal of the ink cartridge 30 from the cartridge receiving portion 110 with respect to the front-rear direction 8. Further, throughout the description, "facing frontward" implies facing in a direction including a component of the frontward direction, and "facing rearward" implies facing in a direction including a component of the rearward direction. Further, "facing downward" implies facing in a direction including a component of a downward direction, and "facing upward" implies facing in a direction including a component of an upward direction. For example, "a front surface faces frontward" implies not only that the front surface faces frontward, but also that the front surface faces in a direction slanting relative to the frontward direction.

<Outline of Printer 10>

As illustrated in FIG. 1, the printer 10 is an image-forming apparatus configured to form an image on a sheet by ejecting ink droplets thereon based on an inkjet recording scheme. The printer 10 may be an inkjet printer, for example. The printer 10 includes the cartridge receiving portion 110, a recording head 21, and an ink tube 20.

The cartridge receiving portion 110 is configured to receive the ink cartridge 30 according to the embodiment. The cartridge receiving portion 110 has one end face formed with an opening 112. The ink cartridge 30 can be inserted frontward into the cartridge receiving portion 110 through the opening 112, and the ink cartridge 30 can be pulled out rearward from the cartridge receiving portion 110 through the opening 112.

Incidentally, FIG. 1 depicts a state where the ink cartridge 30 has been completely accommodated in the cartridge receiving portion 110. That is, in FIG. 1, the ink cartridge 30 is in an attached state thereof. The ink cartridge 30 illustrated in FIG. 1 (in the attached state) is in the attached posture.

The ink cartridge 30 stores liquid therein. Specifically, the ink cartridge 30 stores ink (as an example of liquid of the disclosure) to be used in the printer 10. In the attached state of the ink cartridge 30 to the cartridge receiving portion 110, the ink cartridge 30 and the recording head 21 are connected to each other through the ink tube 20. The recording head 21 is configured to eject the ink supplied from the ink cartridge 30 through a plurality of nozzles 29. Specifically, a head control board (not illustrated) provided in the recoding head 21 is configured to selectively apply a driving voltage to a plurality of piezoelectric elements each corresponding to each nozzle 29 to eject the ink through the selected nozzles 29. That is, the recording head 21 is configured to consume the ink stored in the ink cartridge 30 attached to the cartridge receiving portion 110.

The printer 10 also includes a sheet tray 15, a feeding roller 23, a sheet conveying passage 24, a pair of conveying rollers 25, a platen 26, a pair of discharging rollers 27, and a discharge tray 16. The feeding roller 23 is configured to feed a sheet on the sheet tray 15 onto the sheet conveying passage 24. The sheet conveyed to the sheet conveying passage 24 then reaches the pair of conveying rollers 25. The conveying rollers 25 are then configured to convey the sheet onto the platen 26. The recording head 21 selectively ejects ink onto the sheet while the sheet moves over the platen 26 to form an image on the sheet. The sheet having moved past the platen 26 is then conveyed to the pair of discharging rollers 27. The discharging rollers 27 are configured to discharge the sheet onto the discharge tray 16 which is positioned most downstream in the conveying passage 24.

<Cartridge Receiving Portion 110>

As illustrated in FIG. 1, the cartridge receiving portion 110 includes a casing 101 and the ink needle 102. The ink cartridge 30 can be accommodated in the cartridge receiving portion 110.

As illustrated in FIG. 1, the casing 101 has a box-like shape constituting a housing of the cartridge receiving portion 110. The opening 112 can be exposed to a user interface surface of the printer 10 that a user faces when the user uses the printer 10.

The ink needle 102 is tubular in shape and is positioned at a lower end portion of an end wall 103 of the casing 101. At the end wall 103, the ink needle 102 is arranged at a position corresponding to a through-hole 60 (see FIGS. 2, 4) of the ink cartridge 30 attached to the cartridge receiving portion 110. The ink needle 102 protrudes rearward from the end wall 103 of the casing 101 to have a protruding end (tip end) that is open rearward.

Figure 7:
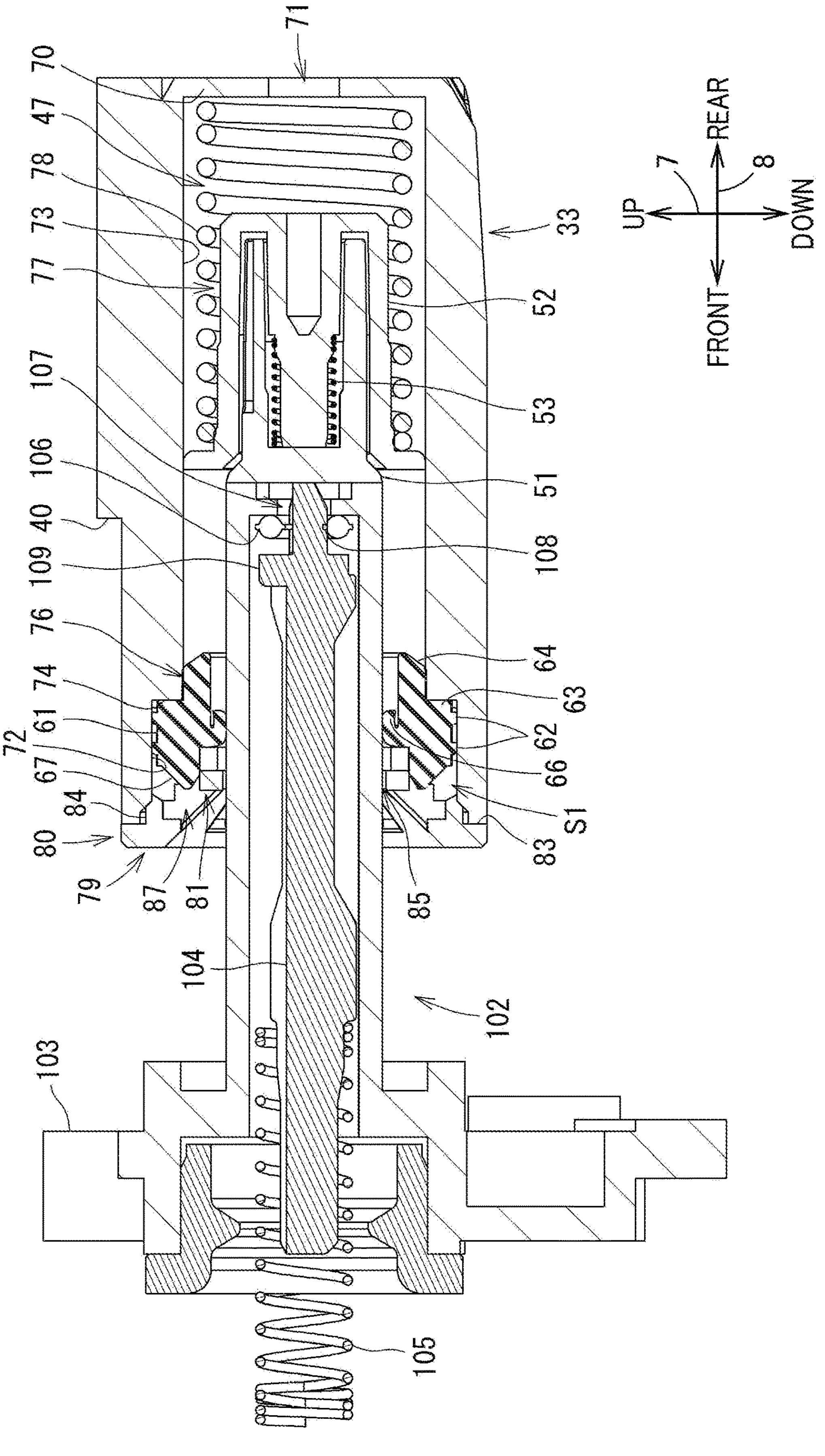
FIG. 7 is a vertical cross-sectional view illustrating a state where an ink needle 102 of the printer 10 is inserted in an internal space of the sleeve 33 of the ink cartridge 30.

As illustrated in FIG. 7, a valve 104, a coil spring 105, and a seal 106 are provided in an internal space of the ink needle 102. The seal 106 is arranged near an opening 107 formed at the tip end (rear end) of the ink needle 102. The seal 106 has a generally annular shape, and is formed of an elastic member such as rubber and elastomer. The seal 106 has a through-hole 108 at a center thereof.

The valve 104 has a rear end portion that penetrates through the through-hole 108. The valve 104 has a sealing part 109 having a generally disc-like shape. The sealing part 109 can abut on the seal 106 to provide sealing of the through-hole 108. The coil spring 105 urges the valve 104 in such a direction that the valve 104 seals the through-hole 108, i.e., rearward. The rear end portion of the valve 104 urged by the coil spring 105 protrudes rearward from the tip end (rear end) of the ink needle 102. In this state, the sealing part 109 abuts on the seal 106. As illustrated in FIG. 7, when an inner valve 51 (described later) abuts on the valve 104, the valve 104 is moved frontward against an urging force of the coil spring 105, separating sealing part 109 away from the seal 106. Hence, ink can flow through the through-hole 108 of the seal 106.

<Ink Cartridge 30>

Figure 2:
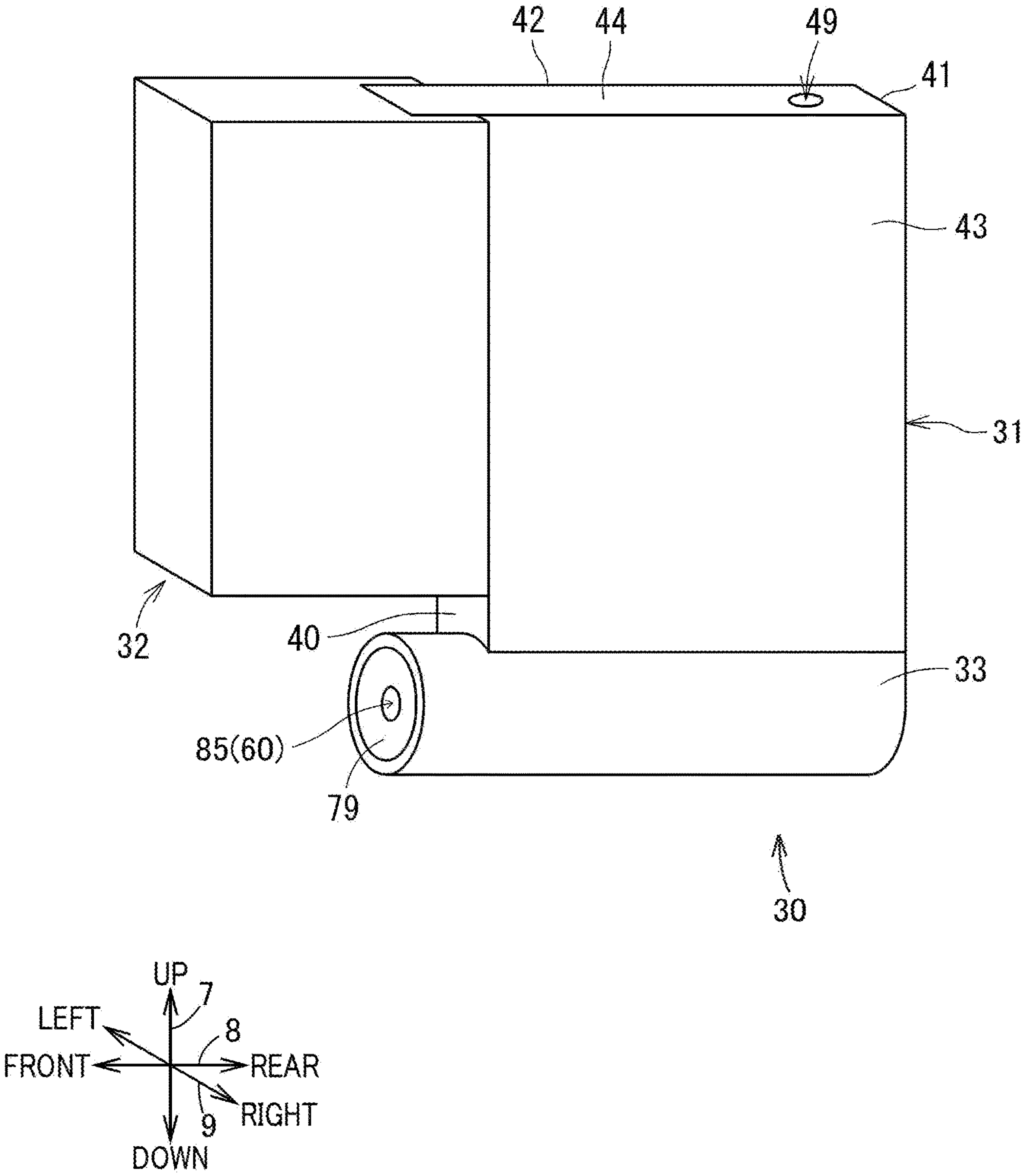
FIG. 2 is a perspective view of an ink cartridge 30 according to one embodiment of the disclosure.

The ink cartridge 30 is a container configured to store ink therein as liquid. As illustrated in FIG. 2, the ink cartridge 30 includes a main body 31, a cover 32, and the sleeve 33.

As illustrated in FIG. 2, the main body 31 has a generally flat rectangular parallelepiped shape whose dimension in the left-right direction 9 is smaller than dimensions in the up-down direction 7 and the front-rear direction 8.

The cover 32 has a generally flat rectangular parallelepiped shape that is smaller in size than the main body 31. The cover 32 has an opening that is open rearward. The cover 32 is attached to the main body 31 such that the cover 32 covers a part of the main body 31, the part belonging to a front wall 40 of the main body 31 and being positioned above the sleeve 33.

The main body 31 includes the front wall 40, a rear wall 41 opposing the front wall 40 in the front-rear direction 8, a left wall 42 connecting the front wall 40 to the rear wall 41, a right wall 43 opposing the left wall 42 in the left-right direction 9, and an upper wall 44 connecting the front wall 40 to the rear wall 41. The sleeve 33 is positioned below the main body 31 to protrude further frontward relative to the front wall 40.

The front wall 40 has an outer surface facing frontward. The rear wall 41 has an outer surface facing rearward. The left wall 42 has an outer surface facing leftward. The right wall 43 has an outer surface facing rightward. The upper wall 44 has an outer surface facing upward.

Figure 3:
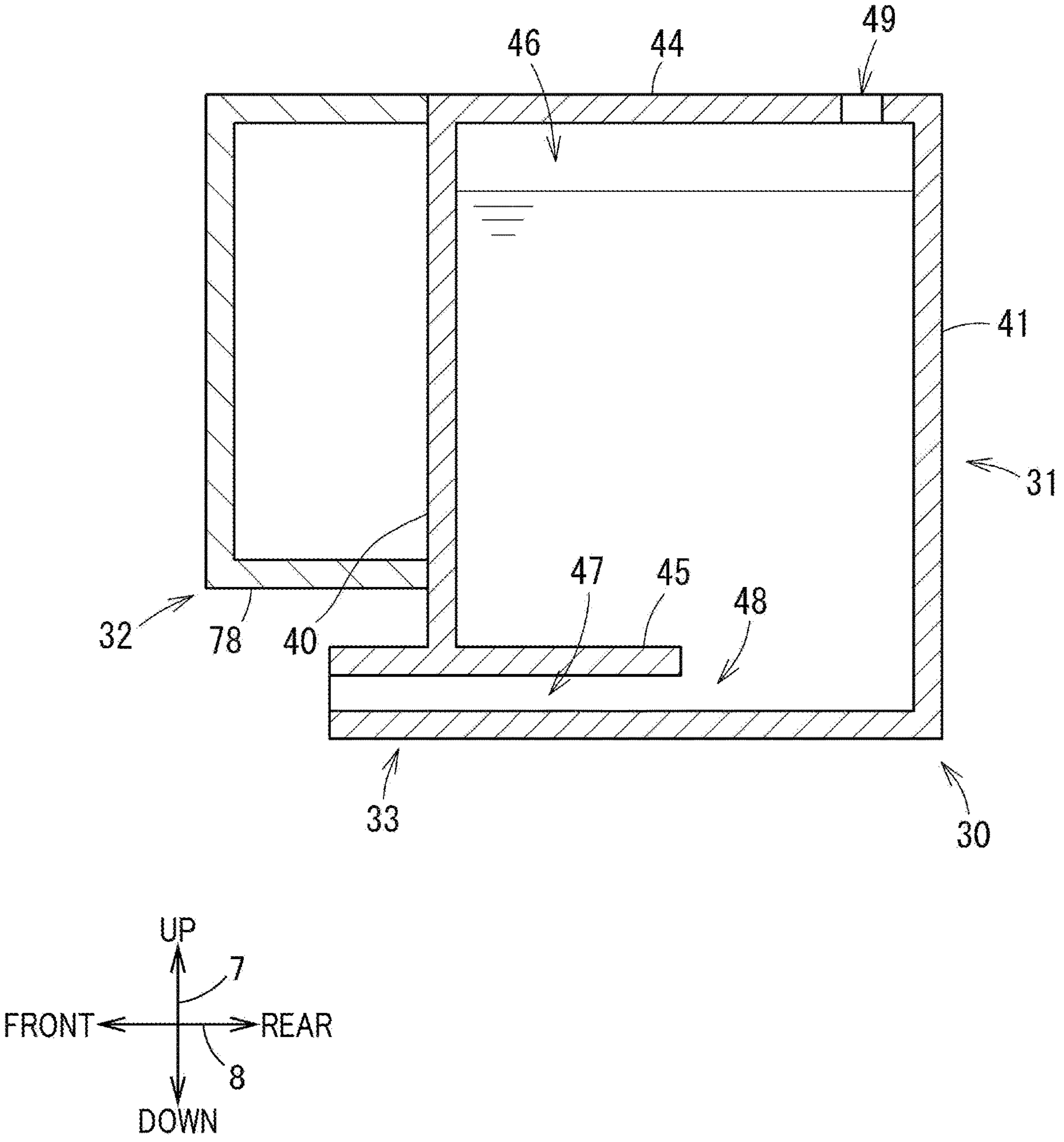
FIG. 3 is a vertical cross-sectional view of the ink cartridge 30.

As illustrated in FIG. 3, the front wall 40, the rear wall 41, the left wall 42, the right wall 43, and the upper wall 44 define in combination an internal space of the main body 31 serving as a storage chamber 46. The storage chamber 46 is positioned between the front wall 40 and the rear wall 41. The front wall 40, the rear wall 41, the left wall 42, the right wall 43, and the upper wall 44 are light transmissive to enable a user to visually recognize a level of the ink stored in the storage chamber 46 from an outside. The main body 31 is a molded product made from, for example, synthetic resin.

The upper wall 44 is formed with an air communication path 49 to provide communication between an upper end portion of the storage chamber 46 and the outside. The air communication path 49 can provide air flow between the storage chamber 46 and the outside. Hence, the air communication path 49 allows an air layer in the storage chamber 46 to have an atmospheric pressure. The air communication path 49 is open on the outer surface of the upper wall 44. That is, the air communication path 49 has an opening that is open upward on the upper wall 44. Incidentally, the air communication path 49 may be closed by a valve or a semi-permeable membrane.

As illustrated in FIGS. 2 and 3, the sleeve 33 is positioned below the main body 31. The sleeve 33 has a hollow cylindrical shape whose axis extends in the front-rear direction 8 (as an example of an extending direction of the disclosure). The sleeve 33 has a dimension in the left-right direction 9 (i.e., outer diameter) that is greater than the dimension of the main body 31 in the left-right direction 9. The sleeve 33 has a front end portion that protrudes frontward from the front wall 40 of the main body 31.

The sleeve 33 has an ink channel 47 defining an internal space of the sleeve 33. The ink channel 47 (internal space of the sleeve 33) has a circular shape in cross-section. The ink channel 47 is partitioned from the storage chamber 46 by a partition wall 45. A communication hole 48 is formed in a rear end portion of the partition wall 45 to provide communication between the ink channel 47 and the storage chamber 46 through the communication hole 48. As such, the ink stored in the storage chamber 46 can flow into the ink channel 47 through the communication hole 48. The sleeve 33 may be integrally molded with the main body 31. Incidentally, in FIG. 3, a detailed structure inside the front end portion of the sleeve 33 is not illustrated.

Figure 4:
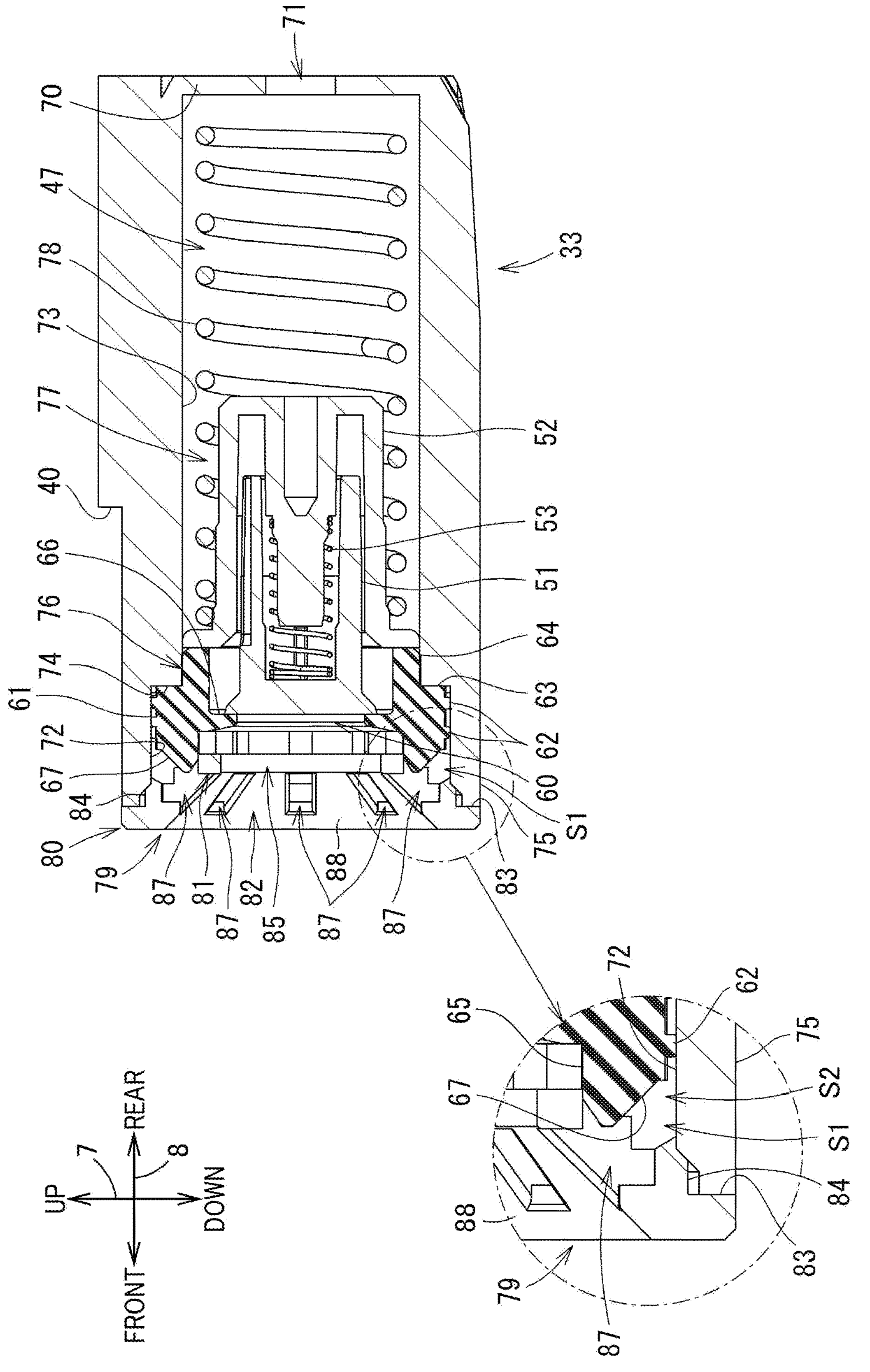
FIG. 4 is a vertical cross-sectional view of a sleeve 33 of the ink cartridge 30.

As illustrated in FIG. 4, a seal 76, a valve 77, and a coil spring 78, are positioned in the internal space of the sleeve 33 (ink channel 47). Further, a cap 79 is positioned at the front end portion of the sleeve 33.

A wall 70 is positioned at a rear end portion of the sleeve 33. The wall 70 extends in a radial direction of the sleeve 33 and functions as a seat on which a rear end of the coil spring 78 is seated. The wall 70 has a through-hole 71 extending in the front-rear direction 8 to penetrate a generally center portion of the wall 70 to allow ink flow through the through-hole 71. Incidentally, while the through-hole 71 of the wall 70 and the communication hole 48 of the partition wall 45 are different through-holes in the present embodiment, the through-hole 71 and the communication hole 48 may be configured as a single through-hole. The front end of the sleeve 33 is open frontward. The open front end of the sleeve 33 is an outlet of the ink channel 47 in the present embodiment. The outlet of the ink channel 47 is an example of an outlet of the disclosure).

The front end portion and the rear end portion of the sleeve 33 have inner diameters different from each other. Specifically, the inner diameter at the front end portion of the sleeve 33 is defined by an inner peripheral surface 72 of the front end portion, while the inner diameter at the rear end portion of the sleeve 33 is defined by an inner peripheral surface 73 of the rear end portion of the sleeve 33. That is, the ink channel 47 has the inner peripheral surface 72 and the inner peripheral surface 73 defining the internal space of the sleeve 33. In the internal space of the sleeve 33 (ink channel 47), the inner diameter defined by the inner peripheral surface 72 at the front end portion is greater than the inner diameter defined by the inner peripheral surface 73 at the rear end portion. Due to this difference in inner diameter, a stepped surface 74 is formed at a boundary between the inner peripheral surface 72 and the inner peripheral surface 73 in the internal space of the sleeve 33. The stepped surface 74 faces frontward.

The seal 76 is positioned adjacent to the front end portion of the sleeve 33. The seal 76 is a seal ring and has an annular shape (a ring shape) having the through-hole 60 (as an example of a first through-hole of the disclosure) at a radially center portion thereof. The seal 76 is made from elastic material such as rubber and elastomer.

Figure 5A:
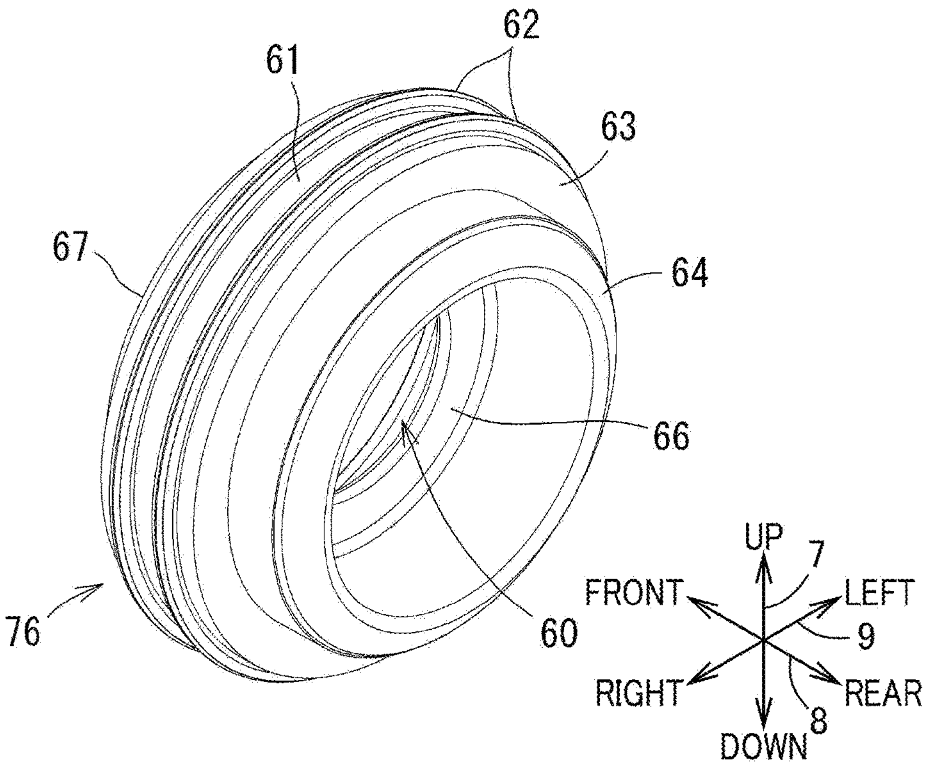
FIG. 5A is a perspective view of a seal 76 as viewed from a rear side thereof.
Figure 5B:
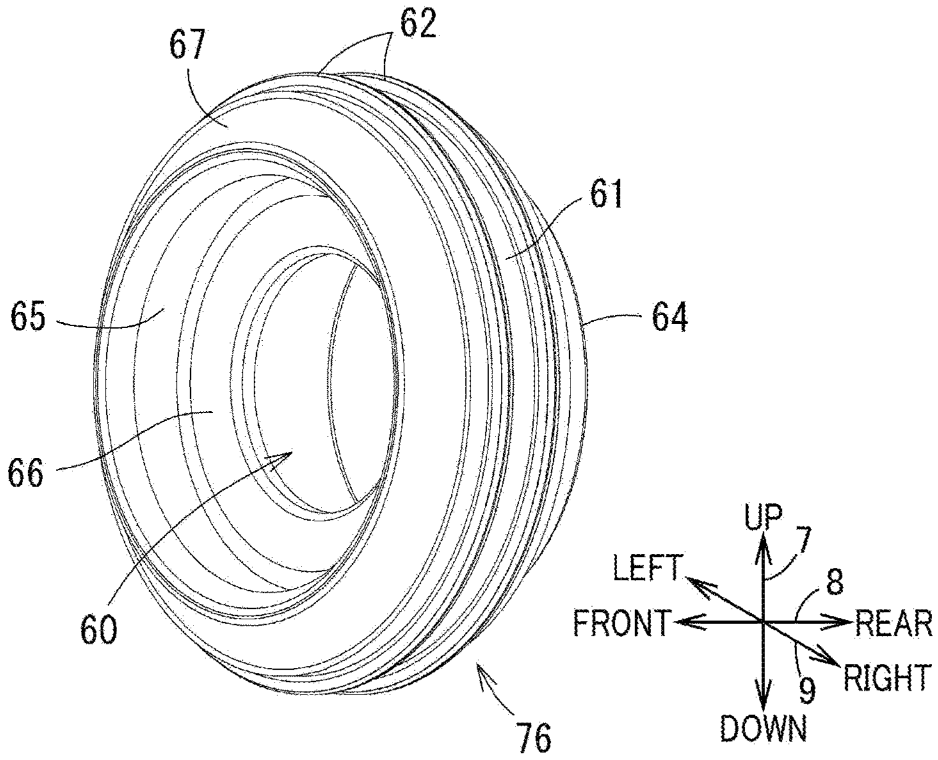
FIG. 5B is a perspective view of the seal 76 as viewed from a front side thereof.

As illustrated in FIGS. 5A and 5B, the seal 76 has an outer peripheral surface 61 from which a pair of annular ribs 62 protrudes radially outwardly. The annular ribs 62 are spaced apart from each other in the front-rear direction 8 on the outer peripheral surface 61. Each annular rib 62 is an endless rib extending along a circumference of the outer peripheral surface 61. As illustrated in FIG. 4, each annular rib 62 is in pressure contact with the inner peripheral surface 72 of the sleeve 33 to provide a liquid-tight seal at the annular ribs 62.

As illustrated in FIG. 5A, the seal 76 has a rear surface 63 from which a hollow cylindrical portion 64 protrudes rearward. The hollow cylindrical portion 64 has an outer diameter that is smaller than an outer diameter of the outer peripheral surface 61. The hollow cylindrical portion 64 has a rear end portion that is tapered to have a thickness gradually reduced toward the rear. The rear surface 63 is in abutment with the stepped surface 74 of the sleeve 33. With this structure, the seal 76 is fixed in position toward the rear.

As illustrated in FIG. 5B, the seal 76 has an inner peripheral surface 65 from which an inner wall 66 extends radially inwardly. The inner wall 66 has a generally disc-like shape. The through-hole 60, a circular hole, is positioned at a radially center portion of the inner wall 66. The through-hole 60 has an axis that is coincident with an axis of the seal 76. The through-hole 60 has an inner diameter that is slightly smaller than an outer diameter of the ink needle 102 in a state where the inner wall 66 is not elastically deformed.

As illustrated in FIG. 5B, the seal 76 has a front surface 67 whose normal line extends diagonally frontward and radially outward. That is, the front surface 67 extends radially inward toward the front, and faces generally frontward.

As illustrated in FIG. 4, the valve 77 is positioned radially inward of the inner peripheral surface 73 of the sleeve 33. The valve 77 is positioned rearward of the seal 76. The valve 77 is positioned closer to the storage chamber 46 than the seal 76 is to the storage chamber 46 in a direction in which the ink in the storage chamber 46 flows out therefrom (will be referred to as an ink out flow direction, hereinafter), since the ink is configured to flow in the frontward direction within the sleeve 33.

The valve 77 has a double-valve structure configured of the inner valve 51, an outer valve 52, and a coil spring 53.

Specifically, the valve 77 has a nested structure in which the inner valve 51 is assembled to the outer valve 52 such that the inner valve 51 is movable in the front-rear direction 8 while being guided by the outer valve 52. The coil spring 53 is positioned in an internal space of the outer valve 52 to urge the inner valve 51 frontward relative to the outer valve 52. The inner valve 51 has a front end configured to abut on the inner wall 66 of the seal 76 to close the through-hole 60. The outer valve 52 is movable in the front-rear direction 8 while making sliding contact with the inner peripheral surface 73 of the sleeve 33. The outer valve 52 is configured to abut on the rear end of the hollow cylindrical portion 64 of the seal 76 to provide a liquid-tight seal between the outer valve 52 and the hollow cylindrical portion 64.

The coil spring 78 is positioned rearward of the valve 77 in the internal space of the sleeve 33. The rear end of the coil spring 78 is seated on the wall 70. The coil spring 78 has a front end that is seated on the outer valve 52 to urge the outer valve 52 frontward. The coil spring 78 provides a spring constant greater than a spring contact of the coil spring 53.

As illustrated in FIG. 4, the cap 79 is positioned frontward of the seal 76. The cap 79 has a generally disc like shape. The cap 79 is fitted with the front end of the sleeve 33. As illustrated in FIG. 6, the cap 79 includes an outer part 80, an inner part 81 positioned radially inward of the outer part 80, and a connecting part 82 that connects the outer part 80 and the inner part 81.

The outer part 80 has a generally flat ring-like configuration. The outer part 80 has an outer diameter equal to the outer diameter of the sleeve 33. As illustrated in FIG. 4, the outer peripheral surface of the outer part 80 is flush with an outer peripheral surface 75 of the sleeve 33.

Figure 6A:
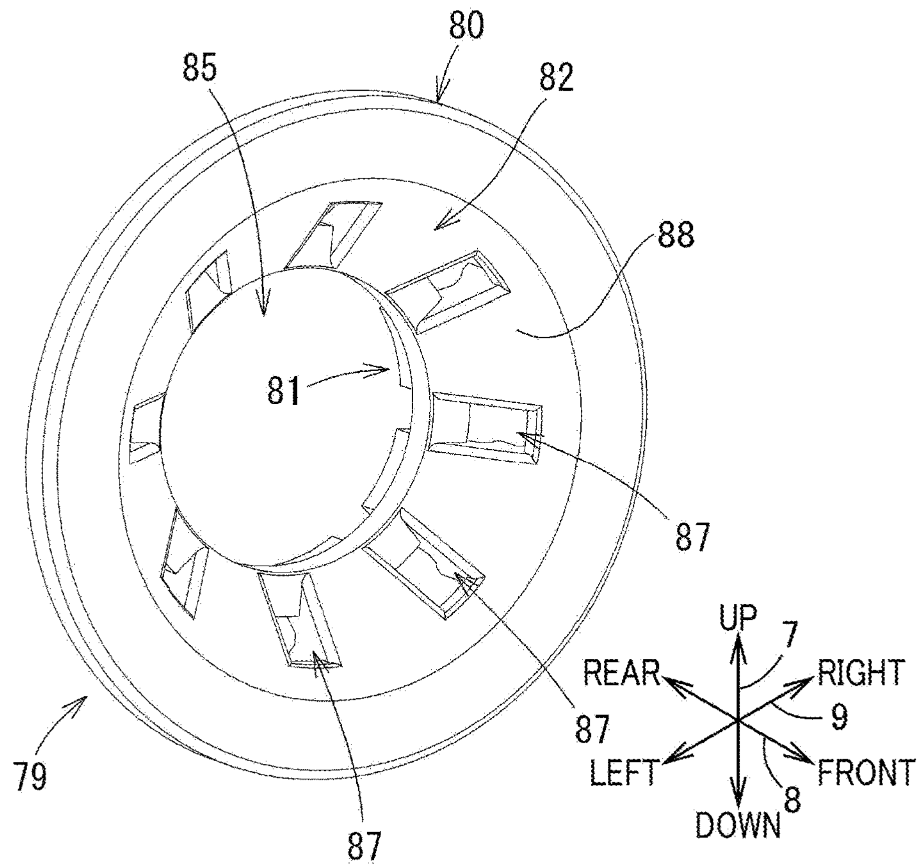
FIG. 6A is a perspective view of a cap 79 as viewed from a front side thereof.
Figure 6B:
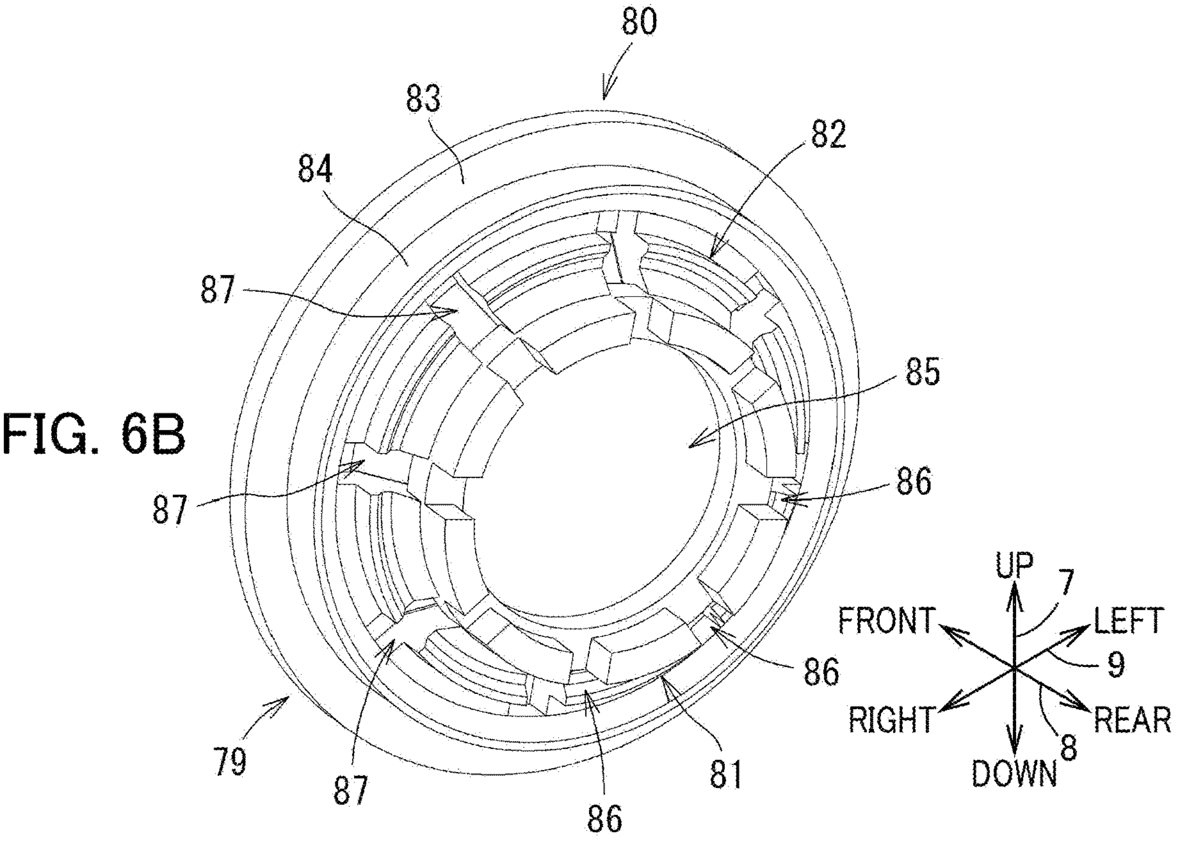
FIG. 6B is a perspective view of the cap 79 as viewed from a rear side thereof.

As illustrated in FIG. 6B, the outer part 80 has a rear surface 83 from which a hollow cylindrical part 84 protrudes rearward. The hollow cylindrical part 84 has an outer diameter that is smaller than the outer diameter of the outer part 80. The outer diameter of the hollow cylindrical part 84 is generally equal to the inner diameter at the inner peripheral surface 72 of the sleeve 33. As illustrated in FIG. 4, the rear surface 83 is in contact with a front end of the sleeve 33. The hollow cylindrical part 84 is in contact with the inner peripheral surface 72 of the sleeve 33. The hollow cylindrical part 84 is bonded to the inner peripheral surface 72 of the sleeve 33 by an adhesive agent, thereby fixing the cap 79 to the sleeve 33.

As illustrated in FIGS. 6A and 6B, the inner part 81 has a generally hollow cylindrical shape. The inner part 81 is positioned rearward of the outer part 80. The inner part 81 has an outer diameter that is smaller than an inner diameter of the outer part 80. At a center of the inner part 81, a through-hole 85 (as an example of a second through-hole of the disclosure) is formed to extend in the front-rear direction 8. The through-hole 85 is circular in cross-section and defines an axis coincident with an axis of the outer part 80 extending in the front-rear direction 8. The through-hole 85 has an inner diameter that is greater than the inner diameter of the through-hole 60 of the seal 76. The inner diameter of the through-hole 85 is greater than the outer diameter of the ink needle 102. As illustrated in FIG. 4, the axis of the through-hole 85 is coincident with the axis of the sleeve 33. That is, the through-hole 85 is coaxially positioned relative to the ink channel 47 (or the sleeve 33) when viewed in the front-rear direction 8. The inner part 81 is fitted on the inside of the seal 76 and is in contact with the inner wall 66 of the seal 76.

As illustrated in FIG. 6B, the inner part 81 has a rear end portion where notched portions 86 are positioned. The notched portions 86 are arranged at equal intervals in a circumferential direction of the inner part 81. Each notched portion 86 extends frontward from a rear edge of the inner part 81. In the present embodiment, eight notched portions 86 are positioned in the inner part 81. Incidentally, in FIG. 6B, the reference numeral 86 is not assigned to all of the notched portions 86.

The connecting part 82 has a frusto-conical or a funnel-like shape connecting the outer part 80 (inner end thereof) to the inner part 81 (a front end thereof). Specifically, the connecting part 82 extends rearward from the inner end of the outer part 80 so as to gradually reduce its diameter toward the inner part 81, and is connected to the front end of the inner part 81. The connecting part 82 has a front surface 88 (as an example of an outer surface of the disclosure) that is recessed rearward toward the through-hole 85 of the inner part 81 (i.e., toward the storage chamber 46). The connecting part 82 does not protrude radially inwardly from the through-hole 85.

The connecting part 82 has a rear end portion where openings 87 are positioned. The openings 87 are arranged in a circumferential direction of the connecting part 82 at equal intervals. In the present embodiment, eight openings 87 are positioned around the through-hole 85. Each opening 87 extends frontward from the rear end of the connecting part 82. Each opening 87 has a rear end defined by the inner part 81. That is, each opening 87 does not communicate with the through-hole 85. Some of the openings 87 are positioned below the axis of the through-hole 85 in the attached state of the ink cartridge 30. Each opening 87 serves to provide communication between the internal space of the sleeve 33 and the outside of the sleeve 33. Incidentally, in FIGS. 6A and 6B, the reference numeral 87 is not assigned to all of the openings 87.

As illustrated in FIG. 4, the hollow cylindrical part 84 of the cap 79 is spaced apart from the seal 76 in the front-rear direction 8 in the internal space of the sleeve 33. The inner part 81 of the cap 79 is in contact with the inner peripheral surface 65 of the seal 76. The hollow cylindrical part 84 and the connecting part 82 of the cap 79, the front surface 67 of the seal 76, and the inner peripheral surface 72 of the sleeve 33 define an annular space S1 (an example of a liquid retaining space of the disclosure). The annular ribs 62 of the seal 76 are positioned rearward of the space S1. That is, the annular ribs 62 are positioned closer to the storage chamber 46 than the space S1 is to the storage chamber 46, i.e., the annular ribs 62 are positioned upstream of the space S1 in the ink outflow direction.

The annular space S1 extends continuously along the inner peripheral surface 72 of the sleeve 33 in a circumferential direction thereof. The space S1 is in communication with the outside of the sleeve 33 through each of the openings 87. In an enlarged vertical partial cross-sectional side view illustrated in FIG. 4, the space S1 includes a narrow gap S2 that is tapered toward the rear, i.e., toward upstream in the ink outflow direction. The narrow gap S2 is defined by the inner peripheral surface 72 of the sleeve 33 and the front surface 67 of the seal 76. The seal 76 is in intimate contact with the inner peripheral surface 72 of the sleeve 33 to provide the liquid-tight seal at a position closer to the storage chamber 46 than the narrow gap S2 is to the storage chamber 46 in the liquid outflow direction.

<Attachment of Ink Cartridge 30 to Cartridge Receiving Portion 110>

Next, a process to attach the ink cartridge 30 to the cartridge receiving portion 110 will be described.

As illustrated in FIG. 4, the inner valve 51 closes the through-hole 60 prior to attachment of the ink cartridge 30 to the cartridge receiving portion 110. Hence, outflow of ink from the ink channel 47 (the internal space of the sleeve 33) to the outside of the ink cartridge 30 is interrupted. Incidentally, the air communication path 49 may be closed or opened at this time.

The ink cartridge 30 is inserted in the cartridge case 101 in such a posture that the front wall 40 of the main body 31 faces frontward and the upper wall 44 of the main body 31 faces upward. As the ink cartridge 30 is inserted into the cartridge receiving portion 110, the ink needle 102 enters into the through-hole 60. The cartridge case 101 has an inner bottom surface having a shape in conformance with the shape of the outer peripheral surface 75 of the sleeve 33 of the ink cartridge 30. Accordingly, since the outer peripheral surface 75 of the sleeve 33 is exposed to the outside, the outer peripheral surface 75 functions as a guide to define a lowermost position of the ink cartridge 30 relative to the cartridge receiving portion 110 while allowing the ink cartridge 30 to move in the front-rear direction 8.

The ink needle 102 is inserted in the through-hole 85 of the cap 79 as illustrated in FIG. 7. At this time, suppose that the ink needle 102 is not aligned with the axis of the through-hole 85, a leading end of the ink needle 102 may possibly abut on the front surface 88 of the connecting part 82 of the cap 79. Still however, since the front surface 88 of the connecting part 82 is recessed toward the through-hole 85 in the present embodiment, the leading end of the ink needle 102 can be guided toward the through-hole 85 by the guidance of the front surface 88 of the cap 79.

The ink needle 102 inserted in the through-hole 85 then enters into the through-hole 60 of the seal 76 as the ink cartridge 30 is inserted further deeper into the cartridge case 101. While the ink needle 102 elastically deforms the inner wall 66 of the seal 76, the outer peripheral surface of the ink needle 102 is in intimate contact with an inner surface of the inner wall 66 defining the through-hole 60 to provide a liquid-tight seal therebetween.

The valve 104 of the ink needle 102 is brought into contact with the inner valve 51 when the leading end of the ink needle 102 reaches the through-hole 60 of the seal 76. Here, the urging force of the coil spring 105 is greater than the urging force of the coil spring 53. As such, in accordance with further insertion of the ink cartridge 30 into the cartridge case 101, the valve 104 moves the inner valve 51 rearward to separate the inner valve 51 from the seal 76 against the urging force of the coil spring 53. The leading end of the ink needle 102 thus moves past the through-hole 60.

The urging force of the coil spring 105 is smaller than the urging force of the coil spring 78. Therefore, in accordance with further insertion of the ink cartridge 30 into the cartridge case 101, the valve 104 moves frontward against the urging force of the coil spring 105, so that the sealing part 109 of the valve 104 is separated from the seal 106 of the ink needle 102. Hence, the leading end of the ink needle 102 thus comes into contact with the inner valve 51.

As the ink cartridge 30 is inserted further into the cartridge case 101, the ink needle 102 moves the inner valve 51 and the outer valve 52 rearward against the urging force of the coil spring 78 to separate the inner valve 51 and the outer valve 52 away from the seal 76. In this way, the ink stored in the storage chamber 46 can flow into the ink channel 47 and the internal space of the ink needle 102.

Incidentally, the air communication path 49 may be opened by the time when the ink cartridge 30 is attached to the cartridge case 101. The air communication path 49 may be opened by a user's operation, or by entry of a rod into the air communication path 49. Further, although not illustrated in the drawings, a locking structure may be provided for restricting the rearward movement of the ink cartridge 30 relative to the cartridge case 101 to maintain the ink cartridge 30 at its attached position in the casing 101 against the urging force of the coil springs 53 and 78.

For detaching the ink cartridge 30 from the casing 101, the process for attaching the ink cartridge 30 described above can be performed in reverse.

As the ink needle 102 is removed from the through-hole 60 of the seal 76, the outer valve 52 urged by the coil spring 78 comes into contact with the seal 76. Further, the inner valve 51 urged by the coil spring 53 closes the through-hole 60 of the seal 76. Hence, outflow of ink from the ink channel 47 through the through-hole 60 does not happen.

Nonetheless, even if the through-hole 60 of the seal 76 is closed by the inner valve 51, conceivably, ink may remain on the through-hole 60. Still conceivably, the ink adhered on the outer peripheral surface of the ink needle 102 may be moved, along with the removal of the ink needle 102 out of the through-hole 85 of the cap 79, to be accumulated on the through-hole 85 of the cap 79. Still conceivably, the ink remaining on the tip end of the ink needle 102 and on the outer side of the seal 106 may be dropped onto the cap 79 from the tip end of the ink needle 102.

Figure 8:
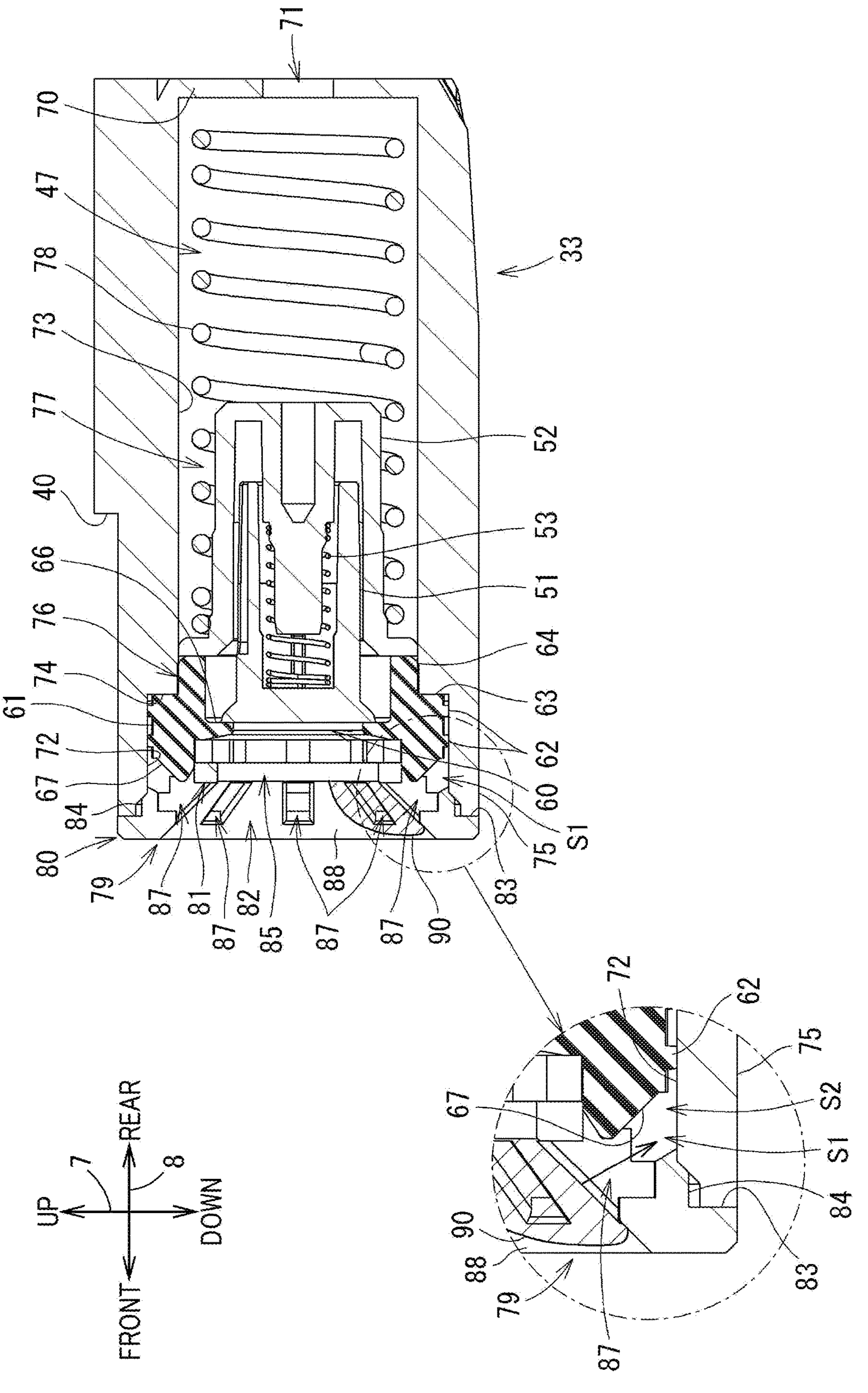
FIG. 8 is a vertical cross-sectional view of the sleeve 33 in a state where ink is flowed out therefrom.

According to the present embodiment, as illustrated in FIG. 8, ink 90 flowing outside of the cap 79 through the through-hole 85 and/or ink dropping onto the cap 79 is adhered on a part of the front surface 88 of the connecting part 82 positioned below the through-hole 85. As indicated by an arrow in FIG. 8, the ink 90 can move from the front surface 88 to the space S1 through the openings 87. The ink 90 is further moved into the narrow gap S2 where the ink 90 is retained by capillary force.

Operational and Technical Advantages According to the Embodiment

Even in a case where the ink 90 deposited on the through-holes 60 and 85 flows out of the cap 79 due to the attachment or detachment of the ink cartridge 30 to and from the cartridge receiving portion 110, the ink 90 can move into the space S1 through the openings 87 of the cap 79. Hence, the ink 90 is less likely to flow to the outside of the ink cartridge 30.

Further, since the ink 90 is retained in the narrow gap S2 by the capillary force, the ink 90 flowing into the space S1 through the openings 87 is hard to flow out to the outside of the ink cartridge 30 through the openings 87.

The ink 90 can flow into the space S1 through the plurality of openings 87, since the plurality of openings 87 are positioned around the through-hole 85. Further, this arrangement also enables some of the openings 87 to be positioned below the axis of the through-hole 85. As such, assembly of the cap 79 to the sleeve 33 can be performed without any consideration to a posture or angular position of the cap 79 relative to the sleeve 33, thereby facilitating the assembling work.

Further, since the cap 79 is fitted with the sleeve 33, the outer peripheral surface 75 of the sleeve 33 is exposed to the outside. Hence, the outer peripheral surface 75 of the sleeve 33 can be utilized for alignment of the ink needle 102 with the through-holes 60 and 85.

Figure 9:
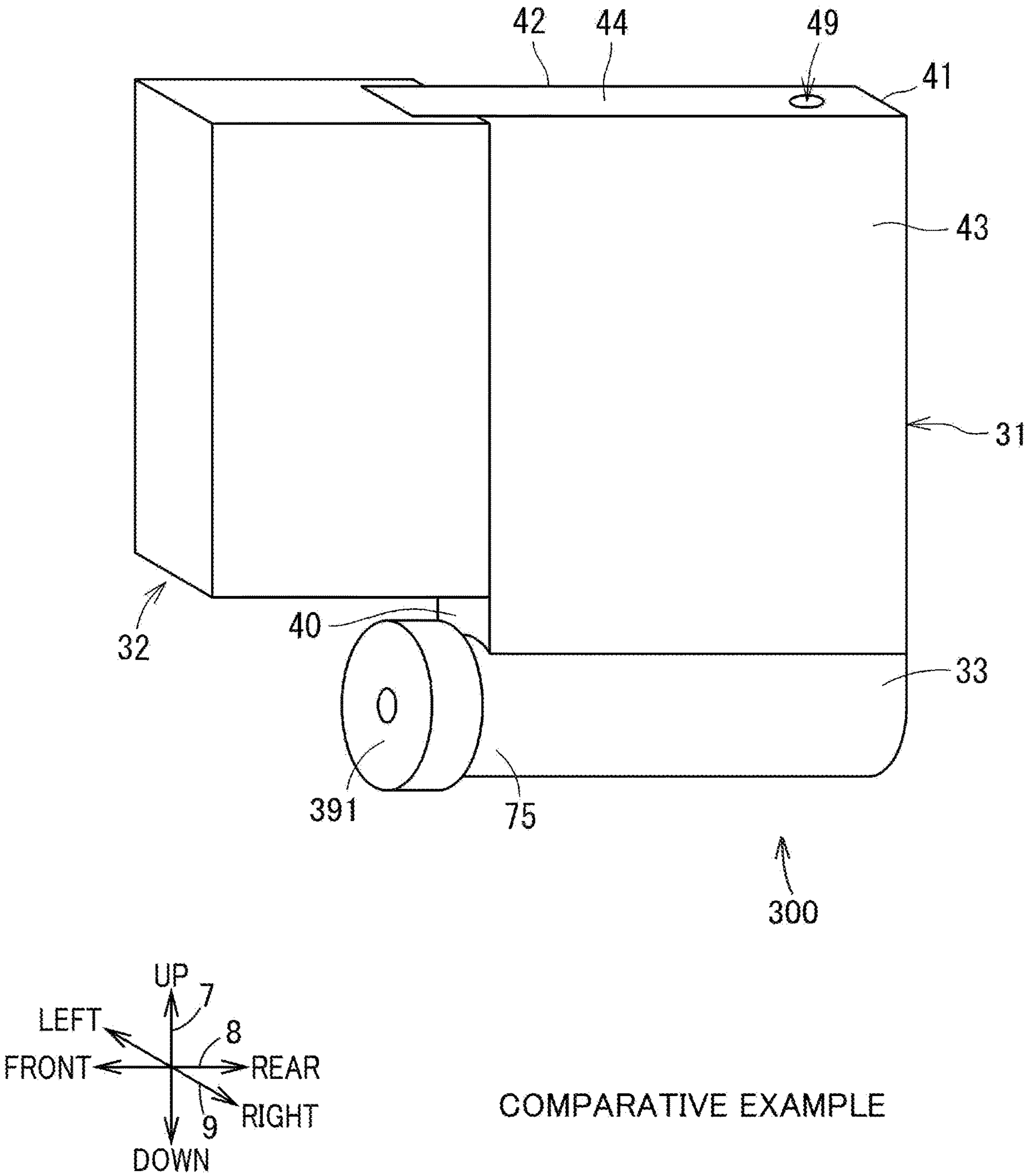
FIG. 9 is a perspective view of an ink cartridge according to a comparative example which has a cap 91 fitted over an outer periphery of the sleeve 33.

Further, the cap 79 is bonded to the inner peripheral surface 72 of the sleeve 33 by an adhesive agent in the present embodiment. As a comparative example, FIG. 9 illustrates an ink cartridge 300 where a cap 391 is fitted with an outer peripheral surface 75 of the sleeve 33. According to this comparative example, a part of the cap 391 needs to protrude radially outwardly from the outer peripheral surface 75 of the sleeve 33. In contrast, in the ink cartridge 30 according to the present embodiment, no part of the cap 79 protrudes radially outwardly from the outer peripheral surface 75 of the sleeve 33. As a result, the ink cartridge 30 of the present embodiment can be made compact, and, hence, the printer 10 including the cartridge receiving portion 110 can also be made compact.

Further, the front surface 88 of the connecting part 82 of the cap 79 is recessed rearward toward the through-hole 85 such that the inner diameter of the front surface 88 is gradually reduced toward the through-hole 85 from the outer part 80. With this structure, the leading end of the ink needle 102 can be guided to the through-hole 85 by the front surface 88 in the process to attach the ink cartridge 30 to the cartridge receiving portion 110.

Further, the openings 87 are spaced apart from the through-hole 85. That is, the openings 87 are not continuous with the through-hole 85. With this configuration, mechanical strength of the cap 79 is less likely to be damaged.

Further, the position of the axis of the through-hole 85 can be fixed by the sleeve 33.

Enhanced positioning accuracy can be ensured for the through-hole 85.

<Modifications and Variations>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The ink channel 47 need not be provided inside the sleeve 33 that protrudes outward from the main body 31 of the ink cartridge 30. For example, the ink channel 47 may be provided inside the main body 31, in a case where the ink cartridge 30 does not include the sleeve 33.

In the above-described embodiment, the space S1 includes the narrow gap S2. However, the space S1 may not include the narrow gap S2. Further, the space S1 may not be annular and may not be continuous in the circumferential direction of the sleeve 33.

Further, the cap 79 according to the above-described embodiment has the plurality of openings 87. Instead, the cap 79 may have a single opening 87. If this is the case, preferably, the single opening 87 be positioned below the axis of the through-hole 85. Further, in a case where the cap 79 has the plurality of openings 87, the openings 87 need not be arranged in the circumferential direction of the connecting part 82 at equal intervals.

Further, the cap 79 may not be fixed to the inner peripheral surface 72 of the sleeve 33 by an adhesive agent. For example, the cap 79 may be fixed to the inner peripheral surface 72 of the sleeve 33 by means of welding or mechanical engagement.

Still further, the cap 79 may be fixed to the front end or to the outer peripheral surface 75 of the sleeve 33. Further, the front surface 88 of the connecting part 82 of the cap 79 may not be recessed rearward. Further, the openings 87 and the through-hole 85 may be continuous with each other to form a space.

Further, in the above-described embodiment, the valve 77 has the nested structure including the inner valve 51 and the outer valve 52. Alternatively, the valve 77 may be configured as a single valve.

Still further, in the above-described embodiment, ink is employed as an example of the liquid of the disclosure. However, instead of the ink, pretreatment liquid to be ejected onto a printing sheet prior to printing may be stored in the liquid cartridge as the liquid of the disclosure. Alternatively, water for cleaning the recording head 21 may be stored in the liquid cartridge as the liquid of the disclosure.

What is claimed is:

1. A liquid cartridge configured to be detachably attached to a cartridge receiving portion in an attached state, the liquid cartridge comprising:

a main body defining therein a storage chamber for storing liquid;

a liquid channel extending in an extending direction to have an outlet that is open to an outside of the liquid cartridge, the liquid channel having an inner peripheral surface defining an internal space in communication with the storage chamber;

a seal positioned in the internal space of the liquid channel and in contact with the inner peripheral surface to provide a liquid-tight seal therebetween, the seal having a first through-hole penetrating through the seal in the extending direction;

a valve configured to open and close the first through-hole, the valve being positioned in the internal space of the liquid channel and closer to the storage chamber than the seal is to the storage chamber in the extending direction; and a cap positioned closer to the outlet of the liquid channel than the seal is to the outlet of the liquid channel, the cap having a second through-hole penetrating through the cap in the extending direction and in communication with the first through-hole, the second through-hole defining an axis extending in the extending direction, wherein the inner peripheral surface of the liquid channel, the seal, and the cap define a liquid retaining space at a position between the seal and the cap, and wherein the cap has a cap opening in communication with the liquid retaining space and the outside of the liquid cartridge, an entirety of the cap opening being positioned below the axis of the second through-hole in the attached state of the liquid cartridge.

2. The liquid cartridge according to claim 1, wherein the liquid retaining space includes a narrow gap that is tapered toward the storage chamber in a vertical cross-sectional side view of the liquid cartridge in the attached state.

3. The liquid cartridge according to claim 2, wherein the seal is in contact with the inner peripheral surface of the liquid channel to provide the liquid-tight seal at a position closer to the storage chamber than the narrow gap is to the storage chamber in the extending direction.

4. The liquid cartridge according to claim 1, wherein the cap has a plurality of openings including the cap opening, the plurality of openings being positioned around the second through-hole.

5. The liquid cartridge according to claim 4, wherein the cap comprises:

an outer part having a ring shape;

an inner part having a hollow cylindrical shape and defining the second through-hole, the inner part being positioned closer to the seal than the outer part is to the seal; and a connection part connecting the outer part to the inner part, the plurality of openings being positioned in the connection part.

6. The liquid cartridge according to claim 5, wherein the outer part has an inner diameter greater than an outer diameter of the inner part, and wherein the connection part has a funnel shape such that a diameter of the connection part is gradually reduced toward the second through-hole.

7. The liquid cartridge according to claim 5, wherein at least one of the plurality of openings is positioned below the axis of the second through-hole.

8. The liquid cartridge according to claim 5, wherein the plurality of openings is arranged in a circumferential direction of the connection part at equal intervals.

9. The liquid cartridge according to claim 5, further comprising a sleeve including the liquid channel and the outlet, wherein the outer part has an outer diameter equal to an outer diameter of the sleeve.

10. The liquid cartridge according to claim 1, wherein the cap is fitted with the outlet of the liquid channel.

11. The liquid cartridge according to claim 10, wherein the cap is fixed to the inner peripheral surface of the liquid channel.

12. The liquid cartridge according to claim 1, wherein the cap has an outer surface that is recessed toward the storage chamber such that a diameter of the outer surface is gradually reduced toward the second through-hole.

13. The liquid cartridge according to claim 1, wherein the cap opening is spaced apart from the second through-hole.

14. The liquid cartridge according to claim 1, wherein the liquid channel has a hollow cylindrical shape, wherein the second through-hole is circular in cross-section, and wherein the second through-hole is coaxially positioned relative to the liquid channel when viewed in the extending direction.

* * * * *